United States Patent [19]

Freyhold et al.

[11] 4,171,986

[45] Oct. 23, 1979

[54] BINDERS BASED ON ALKALI METAL SILICATES AND POTASSIUM METABORATE

[75] Inventors: Helmut v. Freyhold, Düsseldorf-Oberkassel; Wolfgang Persh, Grevenbroich, both of Fed. Rep. of Germany

[73] Assignee: Henkel Kommanditgesellschaft auf Aktien (Henkel KGaA), Düsseldorf-Holthausen, Fed. Rep. of Germany

[21] Appl. No.: 889,988

[22] Filed: Mar. 24, 1978

[30] Foreign Application Priority Data

Apr. 2, 1977 [DE] Fed. Rep. of Germany ....... 2714889

[51] Int. Cl.² ................................................. C09J 1/02
[52] U.S. Cl. .......................................... 106/74; 106/84
[58] Field of Search ................................... 106/74, 84

[56] References Cited

U.S. PATENT DOCUMENTS

| | | | |
|---|---|---|---|
| 1,707,279 | 4/1929 | Okuri | 106/84 |
| 2,665,232 | 1/1954 | Neigh | 106/74 |
| 3,180,746 | 4/1965 | Patton et al. | 106/74 |
| 3,505,086 | 4/1970 | von Freyhold | 106/84 |

*Primary Examiner*—James Poer
*Attorney, Agent, or Firm*—Hammond & Littell

[57] ABSTRACT

Binders based on aqueous alkali metal silicate solution containing from 20% to 55% by weight of alkali metal silicates having a molar ratio $SiO_2:M_2O$ of 1.8 to 4, and a content of potassium metaborate.

2 Claims, No Drawings

BINDERS BASED ON ALKALI METAL SILICATES AND POTASSIUM METABORATE

BACKGROUND OF THE INVENTION

Binding agents based on aqueous alkali metal silicate solutions have been known for a long time and are used to a great extent in practice. They are used, inter alia, for producing mineral insulating materials, impregnating agents, coating compounds, paints and cements, and for glueing wood, paper, ceramics and mineral material.

When alkali metal silicate solutions alone are used for the said purposes, that is without an additive, the adhesive and cement compounds, insulating layers, coatings and paints produced therewith in many cases do not fulfill the many technical requirements. Thus, there is frequently a deficiency in the hardness, elasticity and resistance to temperature and water. Therefore, a large number of proposals have already been made for improving these properties by suitable additives to the binding agents. In particular, acids, and products which generate acid or which react acid, such as urea, have been proposed as hardeners. However, the large number of known proposals show that the effects obtained in practice are still unsatisfactory.

Another approach has been to incorporate other compounds which harden with reaction, such as mixtures of alkali metal silicate solutions with triglycidyl isocyanurate and, water-soluble amines, and water-soluble quaternary nitrogen compounds, as described in U.S. Pat. No. 3,778,283 to von Freyhold, commonly assigned.

OBJECTS OF THE INVENTION

An object of the present invention is to provide bonding agents based on alkali metal silicate solutions having a shorter setting time and whose bonds have an improved resistance to water.

Another object of the present invention is to provide an adhesive binder based on an aqueous alkali metal silicate solution consisting essentially of water containing (a) from 20% to 55% by weight of an alkali metal silicate having a molar ratio of $SiO_2:M_2O$ of from 1.8:1 to 4.0:1, where M represents an alkali metal, and (b) potassium metaborate, where the molar ratio of $SiO_2$:potassium metaborate is from 0.1:1 to 50:1.

These and other objects of the invention will become more apparent as the description thereof proceeds.

DESCRIPTION OF THE INVENTION

The above objects have been achieved and the deficiencies of the prior art have been overcome by the development of an adhesive binding agent comprising an aqueous alkali metal silicate solution having a molar ratio of $SiO_2:M_2O$ of from 1.8 to 4.0 and a solids content of 20% to 55% by weight, where M is alkali metal, and a content of potassium metaborate.

More particularly the invention relates to an adhesive binder based on an aqueous alkali metal silicate solution consisting essentially of water containing (a) from 20% to 55% by weight of an alkali metal silicate haveing a molar ratio of $SiO_2:M_2O$ of from 1.8:1 to 4.0:1, where M represents an alkali metal, and (b) potassium metaborate, where the molar ratio of $SiO_2$:potassium metaborate is from 0.1:1 to 50:1.

The new binding agents contain sufficient potassium metaborate that the molar ratio of $SiO_2:KBO_2$ is from 0.1:1 to 50:1, preferably from 5:1 to 20:1.

The concentration of the alkali metal silicate solutions and the molar ratio of $SiO_2$ to alkali metal oxide ($M_2O$) in the solutions can fluctuate within wide limits and depends upon the particular purpose for which the binding agent is is used. Preferably molar ratios of $SiO_2:M_2O$ of 2.0 to 3.6 are employed. In general, commercially available sodium silicate, potassium silicate or lithium silicate solutions are used.

Advantageously, the potassium metaborate required for producing the novel binding agents is obtained by mixing boric acid with the stoichiometric quantity of concentrated potassium hydroxide solution required by the equation

$$H_3BO_3 + KOH \ominus KBO_2 + H_2O$$

The binding agents are produced simply by mixing the aqueous alkali metal silicate solutions with the quantity of potassium metaborate solution corresponding to the desired molar ratio.

The binding agents of the present invention may contain known additives such as amines and quaternary ammonium bases. The properties of the binding agent solutions and the properties of the compounds manufactured therewith can be further modified by means of additives of this type. These substances are generally added in quantities of from 0.05% to 1% by weight relative to the total quantity of binding agent. Representative amines and quaternary ammonium bases are described in U.S. Pat. No. 3,778,283, incorporated herein by reference.

The binding agents of the present invention are stable under storage and have a high bonding strength. They have a faster rate of setting than the known water glass binding agents. Products produced from the binding agents of the present invention are substantially more resistant to water than those produced with known binding agents based on water glass.

The present invention will now be further described by means of the following Examples, which are not limitative in any respect.

EXAMPLES

EXAMPLE 1

For the purpose of producing molded insulating bodies, 1000 gm of vermiculite powder (grain size 2 to 4 mm or 3 to 6 mm) were in each case mixed with 1000 gm of binding agent. The compounds obtained were pressed in a molding press to form plates, the compounds being compressed to approximately 50% of their original volume. The molded bodies thus obtained had, immediately after pressing, a green strength sufficient for transporting the molded bodies. They were dried at room temperature and then tempered for 6 hours at temperatures of 180° C. or 300° C.

The products A, B and C, in accordance with the invention, were used as bonding agents:

(A) 1887 gm of sodium silicate solution ($SiO_2:Na_2O = 3.42$; 29.2% by weight $SiO_2$; 38.0% by weight solids content; 40°/42° Bé) + 109 gm of potassium metaborate solution produced from 31 gm (0.5 mol) of boric acid, pure, and 78 gm of a 38% potassium hydroxide solution. Molar ratio of $SiO_2:KBO_2 = 17.6$.

(B) 1826 gm of sodium silicate (as under A)+174 gm of potassium metaborate solution produced from 49.6 gm (0.8 mol) of boric acid, pure, and 124 gm of a 38% potassium hydroxide solution. Molar ratio of $SiO_2:KBO_2=10.6$.

(C) 1738 gm of sodium silicate solution (as under A)+261.6 gm of potassium metaborate solution produced from 74.4 gm (1.2 mol) of boric acid, pure, and 187.2 gm of a 38% potassium hydroxide solution. Molar ratio of $SiO_2:KBO_2=6.75$.

The products D to F were used as binding agents for the purpose of comparison:

(D) Sodium silicate solution (as under A), but without any additives.

(E) 1929 gm of sodium silicate solution (as under A)+71 gm of sodium metaborate solution, produced from 31 gm (0.5 mol) of boric acid, pure, and 40 gm of a 50% sodium hydroxide solution. Molar ratio of $SiO_2:NaBO_2=17.9$.

(F) 1880 gm of sodium silicate solution (as under A)+113.6 gm of sodium metaborate solution, produced from 49.6 gm (0.8 mol) of boric acid, pure, and 64 gm of a 50% sodium hydroxide solution. Molar ratio of $SiO_2:NaBO_2=10.95$.

(G) 1865 gm of sodium silicate solution (as under A)+67.5 gm of sodium metaphosphate solution, produced from 30.6 gm $(NaPO_3)_6$ and 36.9 gm of water. Molar ration of $SiO_2:NaPO_3=14.5$ The molded bodies produced with the bonding agents A, B and C in accordance with the invention and greater strength, particularly at the edges, than those obtained with the products D to G.

In order to ascertain the water resistance, the molded insulating bodies were stored in deionized water and their resistance was tested at intervals of 24 hours. The results of this test are given in Table I.

TABLE 1

| | Water resistance of molded insulating bodies made from vermiculite | |
|---|---|---|
| | Tempered at | |
| Bonding agent | 180° C. | 300° C. |
| A | 5 weeks | 7 weeks |
| B | 5 weeks | 7 weeks |
| C | 6 weeks | 7 weeks |
| D | 1 day | 1 day |
| E | 3 days | 1 day |
| F | 5 days | 2 days |
| G | 1 day | 4 days |

Comparable results were obtained when mixtures of vermiculite its binding agents A, B and C were used in the weight ratios of 2:1, 3:1 and 4:1 for the purpose of producing the molded bodies.

EXAMPLE 2

87.2 gm of potassium metaborate solution, which had been produced from 24.8 gm (0.4 mol) of boric acid, pure, and 62.4 gm of a 38% potassium hydroxide solution, were added to 1000 gm of sodium silicate solution $(SiO_2:Na_2O=2.48$; 33.2% by weight $SiO_2$; 47.0% by weight of solid contents; 50/52° Bé). The molar ratio of $SiO_2:KBO_2$ was 13.8 in the binding agent thus obtained.

For the purpose of producing cores, 9.6 kg of molding sand were mixed with 400 gm of the above-described binding agent. The mixture was pressed in molds and the press forms were hardened by gas treatment with carbon dioxide (0.5 atmospheres gauge pressure $CO_2$; 7 seconds) and were then tempered for 60 minutes at 180° C. In order to ascertain their storage stability, the cores thus obtained were stored in a climatic test cabinet at 25° C. and 75% air humidity. The shearing strength of the cores was ascertained as an indication of their storage stability at the intervals of time after manufacture, and the results are given in Table II.

For the purpose of comparison, cores were produced by the method described above but with the use of the above-mentioned sodium silicate solution without an additive of $KBO_2$ and their behavior during storage was tested. The results of the storage stability test are given in Table II.

TABLE II

| Storage stability of the cores at 25° C. and 75% air humidity | | |
|---|---|---|
| | Shearing strength in $kp/cm^2$ | |
| Storage time | Bonding agent in accordance with the invention | Comparison |
| 24 hours | 80 | 65 |
| 72 hours | 60 | 28 |
| 1 week | 49 | 26 |
| 2 weeks | 42 | 32 |
| 3 weeks | 42 | 31 |
| 4 weeks | 35 | 26 |

EXAMPLE 3

Asbestos-cement plates and asbestos-cement cellulose plates were glued to one another for the purpose of producing stronger components. The sodium silicate solutions, described in Example 1 under A to C, as modified with potassium metaborate, were used as binding agents. The composite plates were dried for 6 hours at 180° C. When the components thus obtained were stored for 6 weeks in water and attempts were then made to loosen the joint by force, the material of the plates was fractured but not the glued joint.

For the purpose of comparison, asbestos-cement plates and asbestos-cement cellulose plates were glued to one another by using a sodium silicate solution ($SiO_2:Na_2O=3.42$; 29.2% by weight $SiO_2$; 38.0% by weight solids content of 40/42° Bé) without an additive of potassium metaborate, and were dried for 6 hours at 180° C. When these composite elements were stored in water, the plates could be separated from one another after 3 days without damage to the material at the glued joints.

EXAMPLE 4

When producing spirally coiled cardboard tubes, webs of paper coated with a water glass binding agent were wound spirally onto a spindle, pressed and at the same time further conveyed on the spindle. The bond between the layers of paper has to harden in fractions of a second to an extend where the webs can no longer be displaced relative to one another during further conveying of the coiled tube. When severing the pieces of tube at the end of the spindle, the end of the outer webs of paper located at the cut edge must not become detached.

In order to meet the requirement with respect to rapid hardening of the bond, it was hitherto necessary to use water glass solutions having a high content of solid substances and a high viscosity ($\geq 350$ mP). Before applying these solutions to the webs of paper, the viscosity of the solutions had to be reduced by heating (150–180 mP) to an extent where a thin coating of bonding agent was ensured.

When using the bonding agents in accordance with the invention, their viscosity can be reduced by dilution to the values required for application, without dropping below the required minimum setting rate.

In a corresponding practical experiment, a sodium silicate solution ($SiO_2:M_2O=2.69$; 31.3% by weight $SiO_2$; 43.3% by weight solids content, 47.5° Bé) having a viscosity of approximately 400 mP was used as a known binding agent. When this solution was applied at 55°–60° C., satisfactory tubes could be obtained when the paper webs were fed to the spindle at a rate of up to 30 m/min. As the binding agent in accordance with the invention, the above-described sodium silicate solution but modified with potassium metaborate ($SiO_2:KBO_2=15.3$) was used. The viscosity was adjusted to 180 mP. When the binding agent was applied at room temperature, the paper webs could be fed at rates of up to 30 m/min without any trouble occurring. When the bonding agent was applied at 40° to 45° C., the speed of the strip could be increased to 40 m/min.

The preceding specific embodiments are illustrative of the practice of the invention. It is to be understood however, that other expedients known to those skilled in the art or disclosed herein, may be employed without departing from the spirit of the invention or the scope of the appended claims.

We claim:

1. An adhesive binder based on an aqueous alkali metal silicate solution consisting essentially of water containing (a) from 20% to 55% by weight of an alkali metal silicate having a molar ratio of $SiO_2:M_2O$ of from 1.8:1 to 4.0:1, where M represents an alkali metal, and (b) potassium metaborate, where the molar ratio of $SiO_2$: potassium metaborate is from 5:1 to 20:1.

2. The adhesive binder of claim 1 wherein the molar ratio of $SiO_2:M_2O$ is from 2.0:1 to 3.6:1.